No. 816,596. PATENTED APR. 3, 1906.
N. PERZOFF.
COUPLING FOR INTERNALLY AND EXTERNALLY ARMORED HOSE.
APPLICATION FILED JUNE 8, 1905.
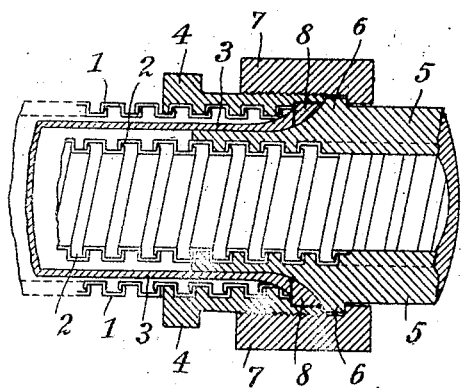
Witnesses
Inventor
Nicolas Perzoff
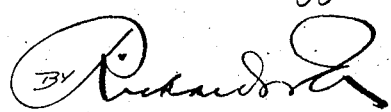

UNITED STATES PATENT OFFICE.

NICOLAS PERZOFF, OF ST. PETERSBURG, RUSSIA.

COUPLING FOR INTERNALLY AND EXTERNALLY ARMORED HOSE.

No. 816,596.

Specification of Letters Patent.

Patented April 3, 1906.

Application filed June 8, 1905. Serial No. 264,321.

*To all whom it may concern:*

Be it known that I, NICOLAS PERZOFF, a subject of the Emperor of Russia, residing at St. Petersburg, in the Empire of Russia, have invented a new and useful Coupling for Internally and Externally Armored Hose, of which the following is a specification.

Hitherto flexible metallic tubes made of sheet metal and having the external appearance of screw-spindles with square threads were united by soldering, which method, however, is tedious and presents the defect that the flexible tubes were liable to leakages owing to their heating.

My invention relates to a coupling by means of which the ends of two flexible metallic tubes of the kind described and one within the other, which are divided by a concentric india-rubber hose between them, may be safely connected without soldering.

The objects of my invention are, first, to screw the end of the internal flexible metallic tube into the corresponding internal thread of the end of a tube or tubular connecting-piece, which end is exte ially reduced in diameter for receiving the end of the india-rubber hose and is provided with a collar; second, to provide a nut which is adapted to be screwed on the end of the external flexible metallic tube and is externally for the greater part provided with a fine screw-thread; third, to provide a counter-nut which can engage in the fine screw-thread of the nut and is adapted to bear against the collar of the tube or tubular connecting-piece for tightening the ends of the india-rubber hose and of the external flexible metallic tube, and, fourth, where so preferred to provide an india-rubber packing-ring. I attain these objects by the coupling illustrated in the accompanying drawing, which represents a longitudinal central section through a coupling according to my invention.

1 denotes the external flexible metallic tube made from a strip of metallic metal which is stamped or pressed or rolled to receive this  cross-section and is afterward spirally wound to form a tube of the external appearance of a screw-spindle with external square thread. 2 denotes the internal flexible metallic tube of a similar kind, and 3 is the india-rubber hose which divides the two flexible metallic tubes 1 and 2 from each other.

For attaching the ends of the india-rubber hose 3 and of the two flexible metallic tubes 1 and 2 to a tube or a tubular connecting-piece 5 the end of the latter is provided with an internal screw-thread, into which the end of the internal flexible metallic tube 2 can be screwed. Moreover, the end of the tube or piece 5 is reduced in diameter for engaging in the end of the india-rubber hose 3 and is provided with a collar 6. The reduced part of the end of the tube or piece 5 is rounded to lead up to the collar 6, as is clearly shown in the drawing. A nut 4 is adapted to be screwed on the end of the external flexible metallic tube 1. It is externally provided for the greater part of its length with a fine screw-thread, the internal diameter of which is slightly larger than that of the collar 6. A counter-nut 7 is provided which can engage in the external screw-thread of the nut 4 and is adapted to bear against the shoulder of the collar 6. An india-rubber ring 8 is preferably provided for packing the joint. The inner end of the nut 4 may be recessed for the reception of the packing-ring 8.

The coupling is operated as follows: For attaching the india-rubber hose 3 and the two flexible metallic tubes 1 and 2 to the tube or tubular connecting-piece 5 first the end of the internal flexible tube 2 is screwed into the corresponding screw-thread of the tube or piece 5. Then the packing-ring 8 and the end of the hose 3 are placed on the reduced part of the tube or piece 5, and the nut 4, screwed on the end of the external flexible tube 1, is pushed over the packing-ring 8 against the collar 6. Finally, the counter-nut 7 is screwed home on the nut 4, so as to press together the several parts 5, 3, 8, and 4, and thereby to tighten the joint. Obviously the two nuts 4 and 7 require to be shaped properly to facilitate the screwing and the unscrewing operations. They may be hexagonal or octagonal or they may be cylindrical and provided with a plurality of holes or longitudinal recesses in which suitable keys can engage. For disconnecting the members of the coupling of course it is only necessary to turn the counter-nut 7 in the opposite direction with the aid of the respective key, so as to unscrew it from the nut 4. Then the nut 4, with the external flexible tube 1 and the hose 3, may be pushed one after the other off the reduced part of the tube or piece 5, and, if needful, the internal flexible tube 2 may be withdrawn by unscrewing.

From the above description it will be evident that the flexible metallic tubes can be connected and disconnected mechanically by turning the counter-nut 7 in the respective direction, so that all soldering as hitherto is dispensed with.

The coupling described may be varied without deviating from the spirit of my invention.

What I claim as my invention, and desire to secure by Letters Patent, is—

In combination, with an inner pipe 2 and an outer pipe 1, a tubular connecting-piece 5 having a portion of substantially the same diameter as the outer pipe, a projection 6 on said piece 5, said piece 5 having a reduced end in which the end of the inner pipe 2 fits, said reduced end curving outwardly toward the projection 6, a rubber hose extending over said reduced end and curved portion, said hose lying between the inner and outer pipes, packing placed between the end of the hose and the projection 6, a screw-threaded sleeve fitting over the end of pipe 1 and a sleeve 7 having a portion screwed to the sleeve 4 and a projecting portion engaging with the projection 6.

In testimony whereof I have signed my name to this specification in the presence of two subscribing witnesses.

NICOLAS PERZOFF.

Witnesses:
H. A. LOVIAQUINE,
AUGUST MIGNIS.